(12) United States Patent
Arulesan et al.

(10) Patent No.: US 10,178,192 B2
(45) Date of Patent: Jan. 8, 2019

(54) BEHAVIOR-BASED BROWSER BOOKMARKS

(71) Applicant: Qualcomm Innovation Center, Inc., San Diego, CA (US)

(72) Inventors: Veluppillai Arulesan, Toronto (CA); Shiu Wai Hui, Richmond Hill (CA); Stewart Chao, Markham (CA)

(73) Assignee: QUALCOMM Innovation Center, Inc., San Diego, CA (US)

( * ) Notice: Subject to any disclaimer, the term of this patent is extended or adjusted under 35 U.S.C. 154(b) by 605 days.

(21) Appl. No.: 14/854,645

(22) Filed: Sep. 15, 2015

(65) Prior Publication Data

US 2017/0078414 A1 Mar. 16, 2017

(51) Int. Cl.
*H04L 29/08* (2006.01)
(52) U.S. Cl.
CPC .............. *H04L 67/22* (2013.01); *H04L 67/02* (2013.01); *H04L 67/2847* (2013.01)
(58) Field of Classification Search
CPC ..... H04L 67/02; H04L 67/22; H04L 67/2847; H04L 67/2838; G06F 17/30902; G06F 17/3089; G06F 17/30867; G06F 17/30905; G06F 17/30864; G06F 17/30873; G06F 3/04883
See application file for complete search history.

(56) References Cited

U.S. PATENT DOCUMENTS

| | | | | |
|---|---|---|---|---|
| 6,182,122 B1* | 1/2001 | Berstis | .............. | G06F 17/30902 707/E17.12 |
| 7,035,896 B1* | 4/2006 | Schneider | ......... | G06F 17/30873 707/E17.111 |
| 8,015,259 B2* | 9/2011 | Swahn | .............. | G06F 17/30905 709/217 |
| 8,166,134 B2* | 4/2012 | Asai | ........................ | H04L 67/02 709/203 |
| 8,175,989 B1* | 5/2012 | Gopinath | ............... | G06N 7/005 706/45 |
| 8,195,761 B2* | 6/2012 | Carlson | ............. | G06F 17/30902 370/352 |
| 8,245,125 B1* | 8/2012 | Pupius | .............. | G06F 17/30899 715/208 |
| 8,887,239 B1* | 11/2014 | Jain | ........................ | G06F 21/128 726/3 |
| 9,037,638 B1* | 5/2015 | Lepeska | .............. | H04L 67/2847 709/203 |
| 9,313,113 B2* | 4/2016 | Skvortsov | ........... | H04L 43/0876 |
| 9,722,851 B1* | 8/2017 | Hill | .................... | H04L 29/08072 |
| 2002/0186239 A1* | 12/2002 | Komuro | ............ | G06F 17/30884 715/738 |

(Continued)

*Primary Examiner* — Viet D Vu
(74) *Attorney, Agent, or Firm* — Neugeboren O'Dowd PC

(57) ABSTRACT

Methods and apparatus for obtaining web content are disclosed. The method may include storing a history of webpages requested via a browser of the communication device and generating a bookmark for a webpage in response to the at least one webpage being requested more than a threshold number of times at a particular time. The bookmark is then stored in association with the particular time, and when the particular time occurs, the webpage is requested and rendered on the communication device so the webpage is rendered in advance of a user launching the browser.

7 Claims, 5 Drawing Sheets

(56) References Cited

U.S. PATENT DOCUMENTS

| | | | |
|---|---|---|---|
| 2008/0028334 A1* | 1/2008 | De Mes | G06F 17/3089 715/781 |
| 2008/0222269 A1* | 9/2008 | Major | G06F 17/30899 709/217 |
| 2009/0013387 A1* | 1/2009 | Paas | H04L 51/38 726/5 |
| 2010/0023506 A1* | 1/2010 | Sahni | G06F 17/30867 707/E17.014 |
| 2010/0023581 A1* | 1/2010 | Lahav | G06Q 30/02 709/203 |
| 2010/0070928 A1* | 3/2010 | Goodger | G06F 17/30905 715/838 |
| 2010/0082637 A1* | 4/2010 | Mishne | G06F 17/30867 707/748 |
| 2011/0055314 A1* | 3/2011 | Rosenstein | G06F 17/30899 709/203 |
| 2011/0122155 A1* | 5/2011 | Zechlin | G06F 17/30905 345/660 |
| 2011/0185017 A1* | 7/2011 | Rezaiifar | G06F 17/30899 709/203 |
| 2011/0306304 A1* | 12/2011 | Forutanpour | G06F 3/04883 455/67.11 |
| 2012/0272132 A1* | 10/2012 | Mondal | G06F 17/30899 715/234 |
| 2012/0284372 A1* | 11/2012 | Ghosh | H04L 61/1511 709/219 |
| 2012/0303439 A1* | 11/2012 | Flitcroft | G06Q 10/107 705/14.36 |
| 2012/0331409 A1* | 12/2012 | Olliphant | G06F 17/30905 715/760 |
| 2013/0006897 A1* | 1/2013 | Jain | G06F 17/30905 706/12 |
| 2013/0159824 A1* | 6/2013 | Barak | G06F 17/2235 715/205 |
| 2013/0325603 A1* | 12/2013 | Shamir | G06Q 30/0251 705/14.52 |
| 2013/0326005 A1* | 12/2013 | Buczak | G06F 17/30905 709/217 |
| 2014/0040463 A1* | 2/2014 | Skvortsov | H04L 43/0876 709/224 |
| 2014/0115111 A1* | 4/2014 | Duskin | G06Q 30/0255 709/219 |
| 2014/0164134 A1* | 6/2014 | Cope | H04M 3/42008 705/14.64 |
| 2014/0173417 A1* | 6/2014 | He | G06F 17/2247 715/234 |
| 2014/0379688 A1* | 12/2014 | Liang | G06F 17/30864 707/708 |
| 2015/0334172 A1* | 11/2015 | Ravi | G06F 17/2247 709/217 |
| 2016/0042080 A1* | 2/2016 | Nguyen | G06F 17/30867 707/722 |
| 2016/0162482 A1* | 6/2016 | Pesavento | G06K 9/46 707/728 |
| 2016/0164992 A1* | 6/2016 | Prasad | H04L 67/2814 709/217 |
| 2016/0173633 A1* | 6/2016 | Bax | H04L 67/2838 709/219 |
| 2016/0180384 A1* | 6/2016 | Ramer | G06Q 30/02 705/14.53 |
| 2017/0024768 A1* | 1/2017 | So | G06Q 30/0263 |

* cited by examiner

| URL | TIME |
|---|---|
| www.topnews.com | 06:00 |
| www.financial.com | 06:30 |
| ⋮ | ⋮ |
| www.sports.com | 19:30 |

FIG. 4

| URL | LOCATION |
|---|---|
| www.topnews.com | location1 |
| www.financial.com | location2 |
| ⋮ | ⋮ |
| www.sports.com | location3 |

FIG. 5

| URL | LOCATION | TIME |
|---|---|---|
| www.topnews.com | location1 | 06:00 |
| www.financial.com | location2 | 06:30 |
| ⋮ | ⋮ | ⋮ |
| www.sports.com | location3 | 19:30 |

FIG. 6

BEHAVIOR-BASED BROWSER BOOKMARKS

FIELD OF THE INVENTION

The present invention relates to client communication devices. In particular, but not by way of limitation, the present invention relates to communications between a communication device and a network to obtain web content.

BACKGROUND OF THE INVENTION

Advances in technology have resulted in smaller and more powerful personal communication devices. For example, there currently exist a variety of portable personal communication devices, including wireless communication devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs.

Users of such devices are interested in using the devices to access more web based content. Currently, a user may manually create bookmarks for corresponding web pages so that the user may select a webpage from the bookmark list for viewing. But even in the context of wireline-connected computers, the delay associated with finding, selecting a bookmarked web page, and waiting for the page to load may be frustrating for a user. In contrast to a wired communications network, communications through a wireless network may experience yet additional unfavorable delays through sequential transmission and acknowledgement protocols, which increases the time it takes to access web content. As a consequence, improved apparatus and methods for obtaining content with reduced access times are desired.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

According to an aspect, a method of obtaining web content on a communication device includes storing a history of webpages requested via a browser of the communication device, generating a bookmark for a webpage in response to the history indicating the webpage has been requested more than a threshold number of times at a particular time, and storing the bookmark in association with the particular time. When the particular time occurs, the webpage is requested and then rendered on the communication device so the webpage is rendered in advance of a user launching the browser.

Another aspect may include a communication device that includes a clock configured to provide time-of-day information, a browser to enable webpages to be requested via the communication device, and a browsing-data collection component to generate a history of webpages and corresponding request times that the webpages were requested via the browser. The communication device also includes a bookmark generator configured to generate a plurality of bookmarks associated with one or more of the request times, and an autoloader component requests each bookmarked webpage when a time associated with each bookmarked webpage occurs so the bookmarked webpages are rendered in advance of a user launching the browser.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

FIG. 4 depicts data that may be stored in connection with bookmarks;

FIG. 5 depicts alternative data that may be stored in connection with bookmarks;

FIG. 6 depicts yet another alternative of data that may be stored in connection with bookmarks.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

In general, embodiments disclosed herein learn the browsing behavior of a user and enable a web browser to be ready with a website pre-loaded and rendered for the user to view when the browser is launched by the user. According to an aspect, "smart" bookmarks are generated based upon both the sites the user frequents and also the times of the day that the user visits the frequented sites. In this way, a frequented webpage may be automatically loaded and rendered at a time of day that the user historically visits the webpage. According to another aspect, the smart bookmarks may be generated based upon the sites the user frequents in connection with the locations where the communication device is present when the user visits the frequented sites. Consistent with another aspect, both time and location information may be utilized in connection with the frequented websites so that a particular webpage may be retrieved and rendered when the user is in a particular place at a particular time.

Figure 1:
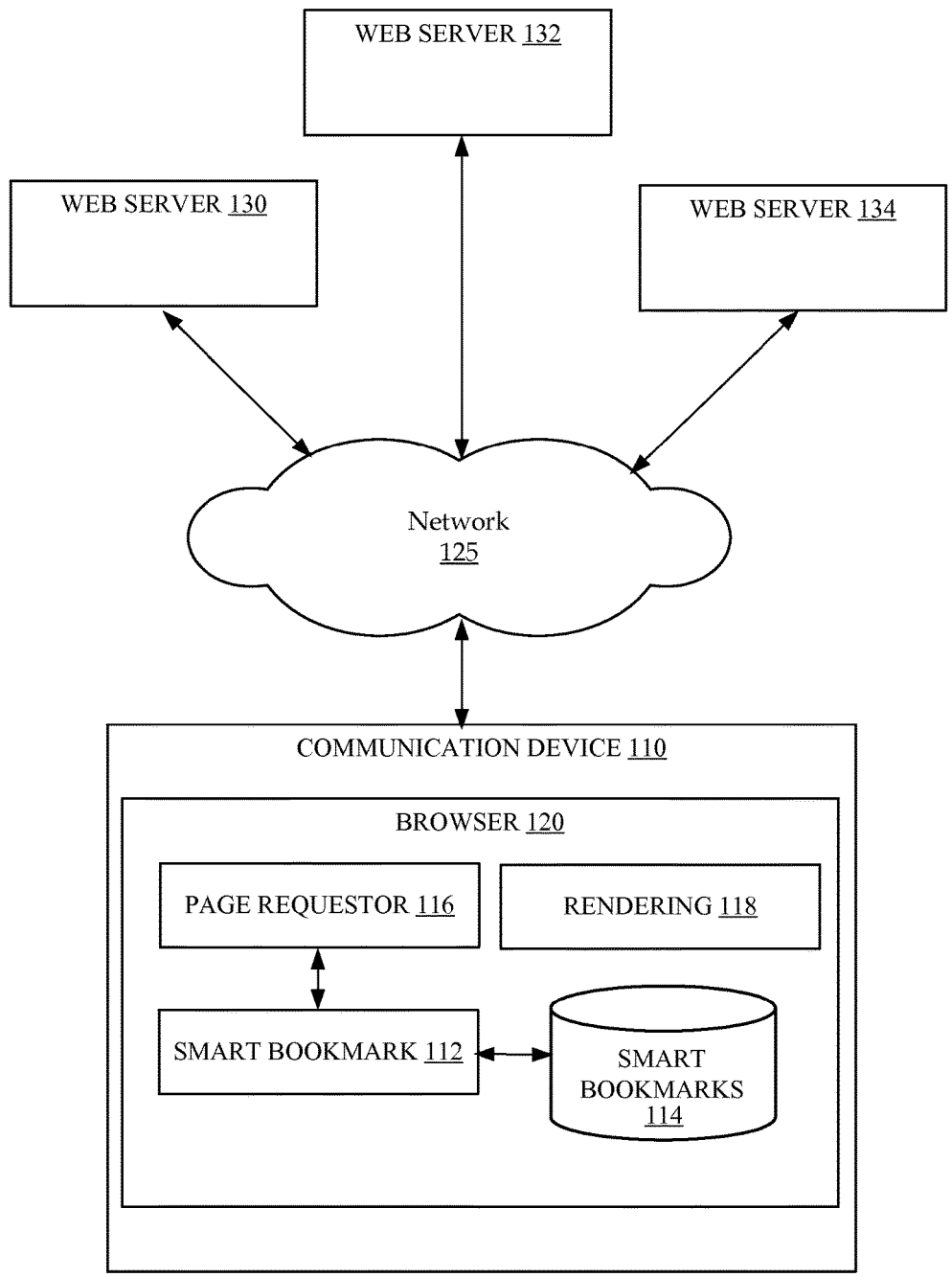
FIG. 1 illustrates a block diagram of a communication network according to several embodiments of the present invention.

Referring first to FIG. 1 for example, shown is a block diagram depicting an exemplary communication network in which embodiments of the present invention may be implemented. As shown, the communication network includes a plurality of web servers 130, 132, 134 in communication with a communication device 110 via a network 125. The web servers 130, 132, 134 generally operate to serve web content that is requested by the communication device 110 (and potentially many other devices) via the network 125. The network 125 may include the Internet, local area networks, cellular networks (e.g., a CDMA network, a GPRS network, a UMTS networks), and other types of communication networks.

As shown, a browser 120 of the communication device 110 includes a smart bookmark module 112 coupled both to a smart bookmarks datastore 114 and a page requestor 116, and the browser 120 also includes a rendering component 118. It should be recognized that the diagram depicted in FIG. 1 is intended to logically depict simplified aspects that are relevant to embodiments of the present invention. One of ordinary skill in the art, for example, will recognize that there are several components of the browser 120 that are not depicted for clarity, but one of ordinary skill in the art, in view of this disclosure will readily be able to implement a variety of embodiments.

Generally, the communication device 110 operates as a client device that enables a user to retrieve web content from one or more of the web servers 130, 132, 134 and the communication device 110 may be realized by client devices including a wireless communications device (WCD) such as a smartphone, PDA, netbook, laptop computer and other wireless devices. But the communication device 110 may work in tandem with wireline and wireless communication devices.

More specifically, the communication device 110 in this embodiment includes a browser 120 that is adapted to include a smart bookmark module 112 that enables web pages to be automatically requested and rendered by a rendering component 118 for a user of the communication device 110; thus substantially reducing the time it takes to access webpages. As shown, the communication device 110 also includes a collection of smart bookmarks 114 that are generated by the smart bookmark module 112, and are utilized by a page requestor 116 to request webpages, which are then rendered by the rendering component 118 of the browser 120.

As one of ordinary skill I the art will appreciate, the content of a webpage may include several content items that are served up by one or more of the servers 130, 132, 134. A webpage, for example, may include a primary content item (e.g., a main page), and secondary content items including resources (e.g., objects) that are constituent elements of a webpage that are associated with the main page. In many instances for example, the secondary content items may include over one hundred objects including text, images, audio content, animation, video, and other content. And as one of ordinary skill in the art will appreciate, the secondary content items are identified by parsing the primary content item (e.g., main page). The primary and secondary content items are requested (e.g., by sending HTTP GETS), and the received objects are rendered by the rendering component 118 of the browser 120 for viewing by a user. In general, the web servers 130, 132, 134 are remote servers that serve web content, and in variations of the embodiment depicted in FIG. 1, one or more of the web servers 130, 132, 134 may be realized by a proxy server.

Although not required, the browser 120 may be realized in part by modifying an existing browser engine (e.g., a Webkit engine) to include the smart bookmark module 112. It should be recognized that the depiction of these components is logical and is not intended to be an actual hardware diagram. For example, the depiction of the browser 120 and its pertinent components is for exemplary purposes only, and as discussed further herein, each component may be further separated into constituent components, but it should also be recognized that the components may be integrated to such an extent that each component may not be separately recognizable in actual implementation. Moreover, the components may be realized by hardware, software in connection with hardware, or firmware, or a combination thereof.

In general, the smart bookmark module 112 learns the behavior of the user and enables the browser 120 to be ready with a webpage pre-loaded and rendered for the user to view when the user launches the browser 120. For example, a webpage may be pre-loaded so that it is rendered, composited, and available as a background tab. According to an aspect, the smart bookmark module 112 generates "smart" bookmarks 114 based upon both the sites the user frequents and also the times of the day that the user visits the frequented sites. In this way, a frequented web page may be automatically loaded and rendered at a time of day that the user historically visits the webpage. According to another aspect, the smart bookmarks 114 may be generated based upon the sites the user frequents in connection with the locations where the communication device 110 is present when the user visits the frequented sites. Consistent with another aspect, both time and location information is utilized in connection with the frequented websites so that a particular webpage may be retrieved and rendered when the user is in a particular place at a particular time.

Figure 2:
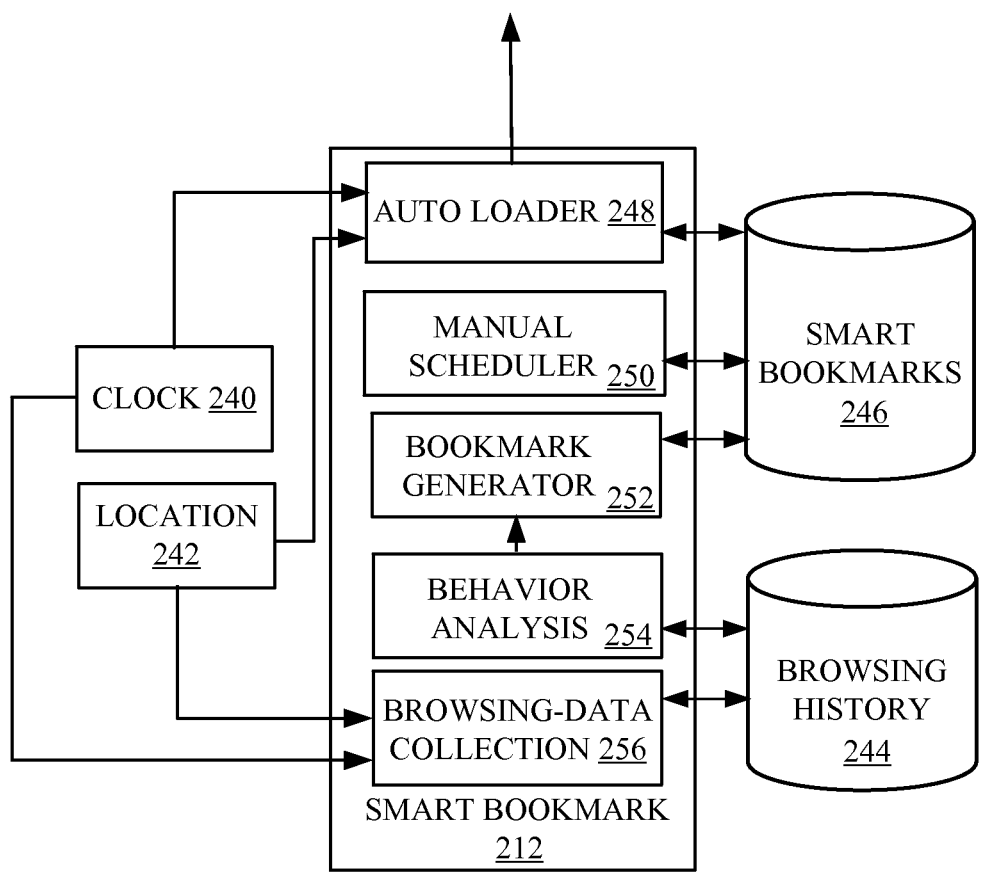
FIG. 2 is a block diagram depicting components of the smart bookmark module depicted in FIG. 1.

Referring next to FIG. 2, shown is a block diagram depicting additional details of an exemplary smart bookmark module 212, which is depicted in connection with a clock 240, a location component 242, a browsing history data store 244, and a smart bookmarks datastore 246. As shown, the smart bookmark module 212 in this embodiment includes an autoloader component 248, a manual scheduler 250, a bookmark generator 252, a behavior analysis component 254, and a browsing-data collection component 256. It should again be recognized that the depiction of components in FIG. 2 is logical and is not intended to be an actual hardware diagram. For example, the depiction of the smart bookmark module 212 is intended to convey logical functions of an exemplary embodiment, and each component may be further separated into constituent components, but it should also be recognized that the components may be integrated to such an extent that each component may not be separately recognizable in actual implementation. Moreover, the components may be realized by hardware, software in connection with hardware, or firmware, or a combination thereof.

The depicted clock 240 generally operates to provide time-of-day information and may be realized by clock hardware of the communication device 110 in connection with an operating system clock driver that interfaces with the clock hardware. The location component 242 generally operates to provide location information (about the location of the communication device 110), and the location component 242 may be realized by hardware of the communication device, such as a global positioning system (GPS) subsystem, or by other location services such as Wi-Fi-based location information provided by the communication device 110. The browsing history datastore 244 and the smart bookmarks datastore 246 may be realized by memory structures (e.g., non-volatile memory) of the communication device.

Figure 3:
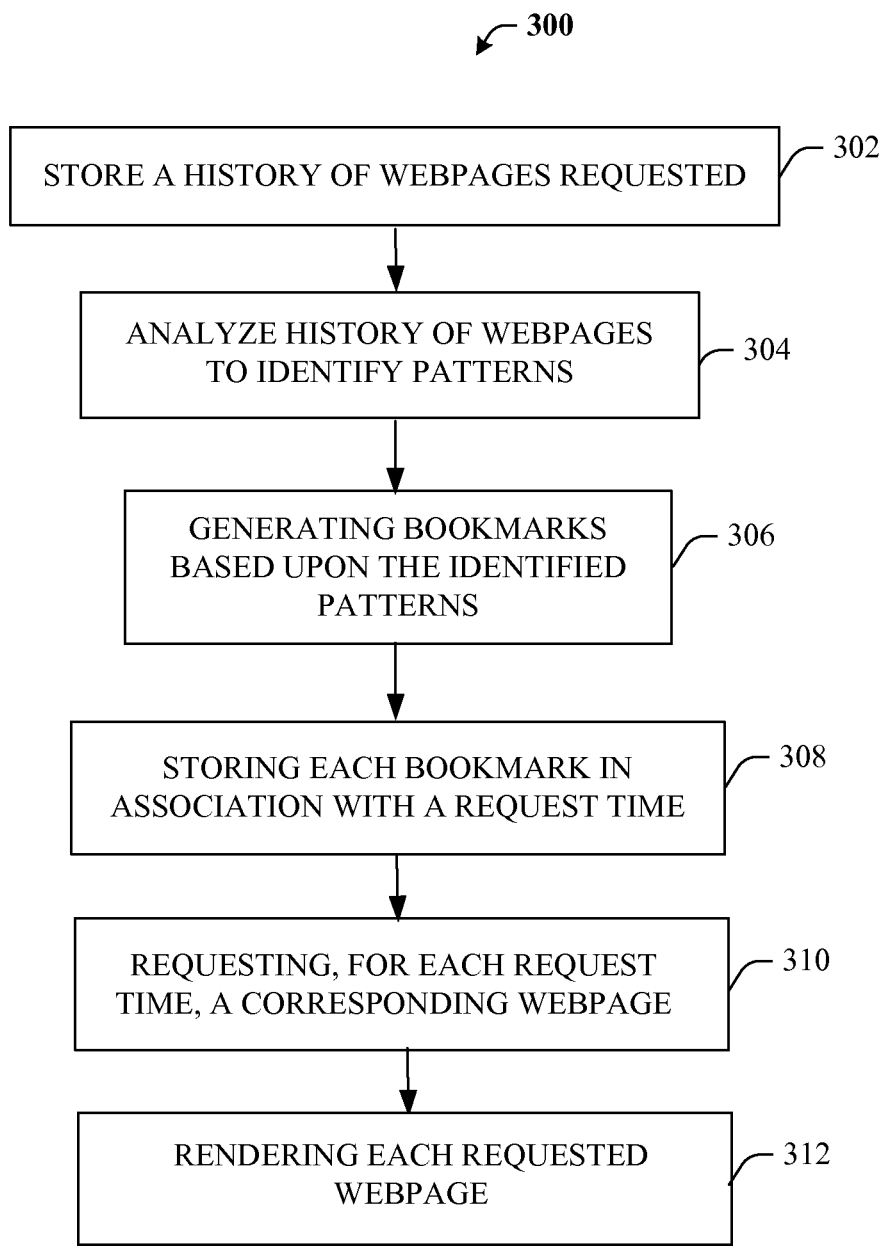
FIG. 3 is a flowchart depicting a method consistent with embodiments disclosed herein.

While referring to FIG. 2 simultaneous reference is made to FIG. 3, which is a flowchart 300 depicting a method that may be traversed in connection with the embodiment illustrated in FIG. 2. As shown, the browsing-data collection component 256 collects and stores a history of webpages requested in the browsing history datastore 244 (Block 302). As shown, the browsing-data collection component 256 is configured to receive time information from the clock component 240 in connection with each request to create a history of webpage requests over time that is captured in the browsing history datastore 244. Although not required, it is also contemplated that location information from the location component 242 may also be captured and stored in connection with webpage requests in the browsing history datastore 244.

The behavior analysis component 254 generally operates to analyze the browsing history captured in the browsing history datastore 244 to identify patterns in the times that particular webpages are requested (Block 304). To identify patterns for example, a 24-hour period may be divided into a collection of smaller time periods, and for each time period, a number of times that each webpage is requested may be tracked. For example, a 24-hour time period may be divided into 24 one-hour periods, 48 half-hour periods, 240 fifteen-minute periods, etc. Then, if a number of occurrences of a particular webpage being requested within a time period exceeds a threshold, the behavior analysis component 254 may prompt the bookmark generator 252 to generate a bookmark for that webpage (Block 306), and the bookmark for that webpage is stored in connection with a request time that corresponds to the time period (Block 308).

Referring to FIG. 4, shown are exemplary smart bookmarks that include a uniform resource locator (URL) and an associated time for loading and rendering the webpage. The time of each smart bookmark associated with each webpage may be set to be a time that is just prior to the historical time that a user typically requests a webpage so that when the user does request a webpage at the typical time, the webpage is already loaded and rendered for the user. By way of specific example, if the user typically requests a webpage between at 7 AM and 7:30 AM, the request time for the smart bookmark for the webpage may be 6:30 AM so that the webpage is completely loaded and rendered if the user (consistent with past behavior of the user) launches the browser 120 at 7:15 AM.

In alternative implementations, it is contemplated that the smart bookmark may be generated to automatically load and render a webpage based upon a location of the communication device 110 such as is shown in FIG. 5. And in yet other implementations, smart bookmarks may be generated based upon both a location of the communication device 110 and a particular time (e.g., as is depicted in FIG. 6) so that both a location condition and a time condition must be met before a webpage is loaded and rendered for the user.

Referring again to FIG. 2, the smart bookmark module 212 may also include a manual scheduler 250 that enables a user to manually create a smart bookmark in connection with a time and/or location in which the bookmarked webpage will be loaded and rendered.

As depicted, the autoloader component 248 is coupled to the smart bookmarks datastore 246, the clock 240, and the location component 242. The autoloader component 248 generally operates to prompt the page requestor 116 to request a webpage when the corresponding request time occurs (Block 310). As depicted, the webpage is then rendered by the rendering component 118 (Block 312). Although not depicted, a content cache may locally cache content (e.g., images, video, and text) on the communication device 110 so that some objects of the webpage need not be retrieved via the network 125.

Some example implementations are discussed above, but those of skill in the art would further appreciate that the various illustrative logical blocks, modules, circuits, and algorithms described in connection with the embodiments disclosed herein may be implemented as electronic hardware, instructions stored in memory or in another processor-readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a DSP, an Application Specific Integrated Circuit (ASIC), an FPGA or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of processor readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Figure 7:
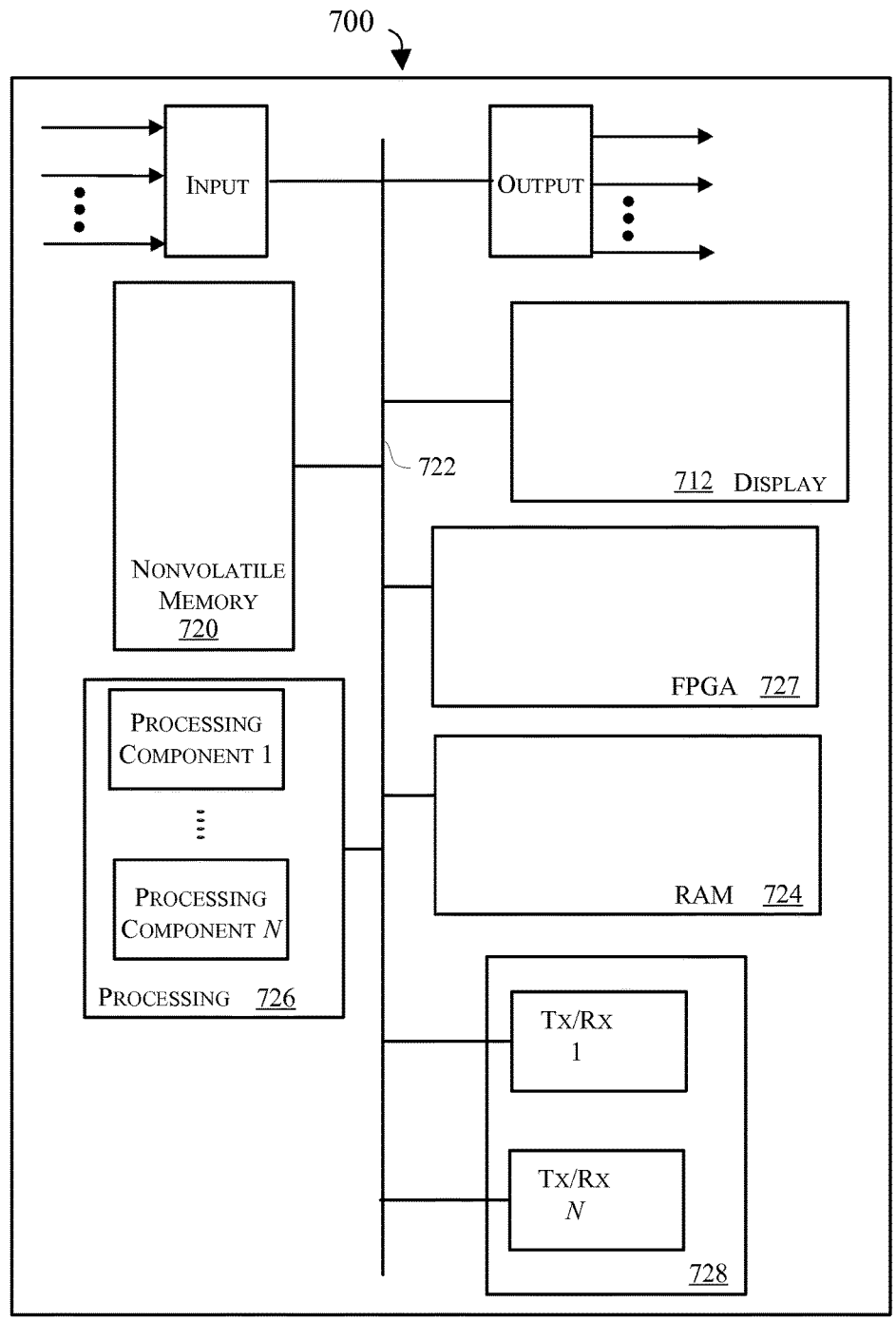
FIG. 7 is a block diagram of an exemplary communication device that can facilitate obtaining content with reduced access times according to aspects disclosed herein.

Referring to FIG. 7 for example, shown is a block diagram depicting physical components that may be utilized to realize the one or more aspects of the embodiments disclosed herein. As shown, in this embodiment a display portion 712 and nonvolatile memory 720 are coupled to a bus 722 that is also coupled to random access memory ("RAM") 724, a processing portion (which includes N processing components) 726, a field programmable gate array (FPGA) 727, and a transceiver component 728 that includes N transceivers. Although the components depicted in FIG. 7 represent physical components, FIG. 7 is not intended to be a detailed hardware diagram; thus many of the components depicted in FIG. 7 may be realized by common constructs or distributed among additional physical components. Moreover, it is contemplated that other existing and yet-to-be developed physical components and architectures may be utilized to implement the functional components described with reference to FIG. 7.

This display portion 712 generally operates to provide a user interface for a user. The display may be realized, for example, by an LCD or AMOLED display, and in several implementations, the display is realized by a touchscreen display. In general, the nonvolatile memory 720 is non-transitory memory that functions to store (e.g., persistently store) data and processor executable code (including executable code that is associated with effectuating the methods described herein). In some embodiments for example, the nonvolatile memory 720 includes bootloader code, operating system code, file system code, and non-transitory processor-executable code to facilitate the execution of the methods described herein including the method described with reference to FIG. 3.

In many implementations, the nonvolatile memory 720 is realized by flash memory (e.g., NAND or ONENAND memory), but it is contemplated that other memory types may be utilized as well. Although it may be possible to execute the code from the nonvolatile memory 720, the executable code in the nonvolatile memory is typically loaded into RAM 724 and executed by one or more of the N processing components in the processing portion 726.

The N processing components in connection with RAM 724 generally operate to execute the instructions stored in nonvolatile memory 720 to enable the loading and rendering of webpages based upon a user's behavior. For example, non-transitory processor-executable instructions to effectuate the methods described with reference to FIG. 3 may be persistently stored in nonvolatile memory 720 and executed by the N processing components in connection with RAM 724. As one of ordinarily skill in the art will appreciate, the processing portion 726 may include a video processor, digital signal processor (DSP), graphics processing unit (GPU), and other processing components.

In addition, or in the alternative, the FPGA 727 may be configured to effectuate one or more aspects of the methodologies described herein (e.g., the methods described with reference to FIG. 3). For example, non-transitory FPGA-configuration-instructions may be persistently stored in nonvolatile memory 720 and accessed by the FPGA 727 (e.g., during boot up) to configure the FPGA 727 to effectuate the functions of the smart bookmark module 212.

The depicted transceiver component 728 includes N transceiver chains, which may be used for communicating with external devices via wireless or wireline networks. Each of the N transceiver chains may represent a transceiver associated with a particular communication scheme (e.g., WiFi, CDMA, Bluetooth, NFC, etc.). The transceiver chains may be utilized to request and receive webpages and webpage objects that are processed (e.g., parsed and rendered) as described herein.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of obtaining web content on a communication device, the method comprising:
    storing, on the communication device, a history of webpages requested via a browser of the communication device;
    generating, with a bookmark generator of the communication device, a bookmark for a webpage in response to the history indicating the webpage has been requested more than a threshold number of times at a particular time;
    storing the bookmark on the communication device in association with the particular time;
    automatically requesting, when the particular time occurs, the webpage with an autoloader component of the communication device;
    rendering the webpage on the communication device so the webpage is rendered in advance of a user launching the browser;
    compositing the webpage on the communication device so the webpage is rendered and composited when the particular time occurs in advance of a user launching the browser;
    preloading the webpage as a background tab of the browser;
    receiving a manually entered time in connection with another webpage;
    requesting, when the manually entered time occurs, the other webpage; and
    rendering the other webpage on the communication device so the other webpage is rendered in advance of the user accessing the browser.

2. The method of claim 1, wherein the storing includes storing a location of the communication device in association with the bookmark and the particular time.

3. A communication device, the communication device comprising:
    a clock configured to provide time-of-day information;
    a browser to enable webpages to be requested via the communication device;
    a browsing-data collection component to generate a history of webpages and corresponding request times that the webpages were requested via the browser;
    a bookmark generator configured to generate a plurality of bookmarks, each of the plurality of bookmarks associated with one or more of the request times, and the bookmark generator is configured to generate each of the bookmarks in response to the history indicating a corresponding webpage has been requested more than a threshold number of times at a particular time;

an autoloader component to automatically request each bookmarked webpage when a time associated with each bookmarked webpage occurs so the bookmarked webpages are rendered and composited in advance of a user launching the browser; and a location component to provide location information, wherein the bookmark generator is configured to generate each of the plurality of bookmarks in association with a location of the communication device.

4. The communication device of claim 3, including a manual scheduler to enable a user to manually generate a bookmark in connection with a specific request time.

5. The communication device of claim 3, wherein the location component is one of a global positioning system component or a Wi-Fi based location services component.

6. A non-transitory, tangible processor readable storage medium, encoded with processor readable instructions to perform a method for obtaining web content on a communication device, the method comprising:

storing, on the communication device, a history of webpages requested via a browser of the communication device;

generating, with a bookmark generator of the communication device, a bookmark for a webpage in response to the history indicating the webpage has been requested more than a threshold number of times at a particular time;

storing the bookmark on the communication device in association with the particular time;

automatically requesting, when the particular time occurs, the webpage with an autoloader component of the communication device;

rendering the webpage on the communication device so the webpage is rendered in advance of a user launching the browser;

compositing the webpage on the communication device so the webpage is rendered and composited when the particular time occurs in advance of a user launching the browser;

preloading the webpage as a background tab of the browser; and receiving a manually entered time in connection with another webpage;

requesting, when the manually entered time occurs, the other webpage; and rendering the other webpage on the communication device so the other webpage is rendered in advance of the user accessing the browser.

7. The non-transitory, tangible processor readable storage medium of claim 6, wherein the storing includes storing a location of the communication device in association with the bookmark and the particular time.

* * * * *